BOWLING BALL ELEVATOR AND RETURN MECHANISMS

Original Filed Aug. 1, 1961 2 Sheets-Sheet 1

Inventors:
Pat Troiano
Philip F. Finelli

BOWLING BALL ELEVATOR AND RETURN MECHANISMS

Original Filed Aug. 1, 1961 2 Sheets-Sheet 2

Inventors:
Pat Troiano
Philip F. Finelli

United States Patent Office

Re. 26,003
Reissued Apr. 26, 1966

26,003
BOWLING BALL ELEVATOR AND RETURN MECHANISMS

Pat Troiano, 4815 Middlesex Lane, and Philip F. Finelli, 4846 Park Ave., both of Bethesda, Md.

Original No. 3,127,172, dated Mar. 31, 1964, Ser. No. 128,411, Aug. 1, 1961. Application for reissue Dec. 21, 1964, Ser. No. 436,403
8 Claims. (Cl. 273—49)

Matter enclosed in heavy brackets [ ] appears in the original patent but forms no part of this reissue specification; matter printed in italics indicates the additions made by reissue.

This invention relates to new and useful improvements in bowling apparatus, and in particular the invention concerns itself with mechanism for returning bowling balls from the alley pit to the players' area.

While conventionally such balls were returned through a trough or runway extending alongside of the alley to a ball storage rack at the players' area, more recent advances in the art have produced an improved arrangement wherein the ball return trough or runway is disposed completely under the alley floor and elevating mechanism is provided at the players' area for delivering balls from the under-floor runway to a ball storage rack above floor. This improved arrangement enhances the appearance of the alley by making the ball return runway invisible, substantially reduces if not altogether eliminates the noise incident to rolling of balls along the return runway, and avoids the hazard of injury resulting from players' fingers being caught between the impact by balls arriving at the storage rack.

The principal object of the present invention is to provide an improved mechanism for elevating balls from the under-floor runway to the storage rack above the floor, an important feature of the invention residing in the provision of novel means whereby the balls are elevated in a positive manner without the use of conveyor belts or oscillating transfer devices, so that the possibility of the balls slipping or becoming dislodged is eliminated. Another important feature of the invention resides in its structural arrangement employing a set of ball elevating wheels in conjunction with ball guideways wherein the elevating capacity of the mechanism in terms of vertical distance through which the balls are lifted is sufficiently great to permit the ball storage rack to be disposed at such height above the floor that players need not unduly bend or stoop to pick up balls therefrom.

Some of the advantages of the invention resides in its simplicity of construction, efficient and dependable operation, in its durability and in its adaptability to economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein.

Figure 1:
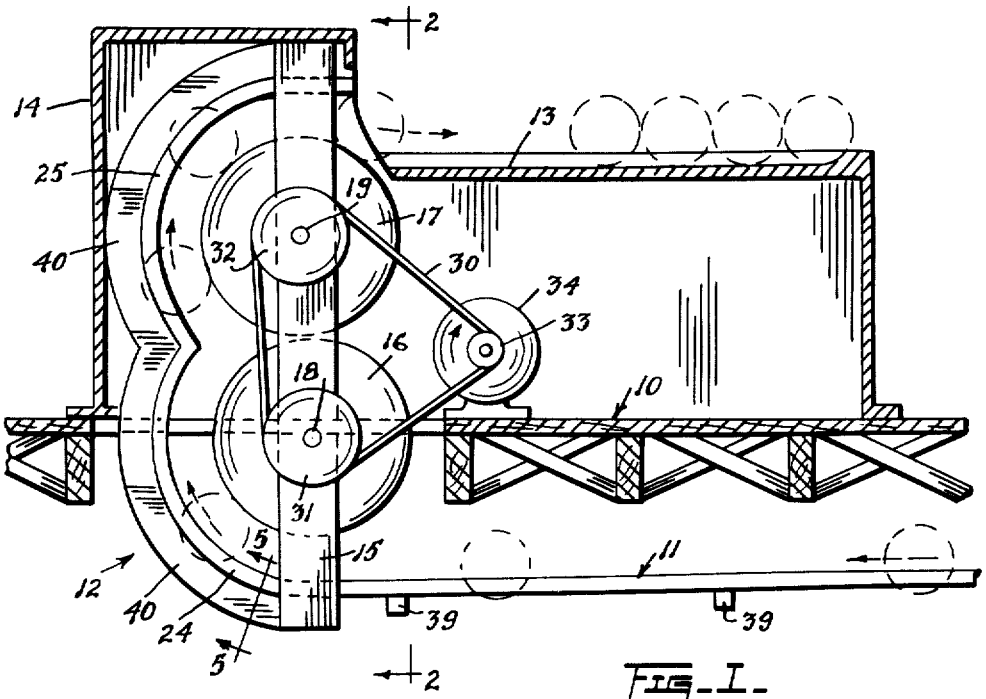
FIGURE 1 is a longitudinal sectional view in a vertical plane, showing the ball elevator and return mechanism in accordance with the invention and its relationship to the floor of the players' area of a bowling alley.

Referring now to the accompanying drawings in detail, the numeral 10 designates the floor of the players' area of a bowling alley while 11 indicates a ball runway for returning balls from the pit (not shown) to the players' area *under free rolling momentum assuring forceful entry of the ball into gripped engagement between the lower wheel and its guide track as hereinafter pointed out.* The runway 11 is disposed below and completely hidden by the floor 10, and the mechanism of the invention, designated generally by the numeral 12, is used for elevating balls from the runway 11 to a suitable ball storage rack 13 located at a conveniently accessible height above the floor 10 so that balls may be picked up by players from the rack without undue bending or stooping.

The ball elevator and return mechanism 12 is contained in a suitable housing 14 which also serves as support for the storage rack 13 and accommodates suitable frame members 15 of the mechanism itself.

Figure 3:
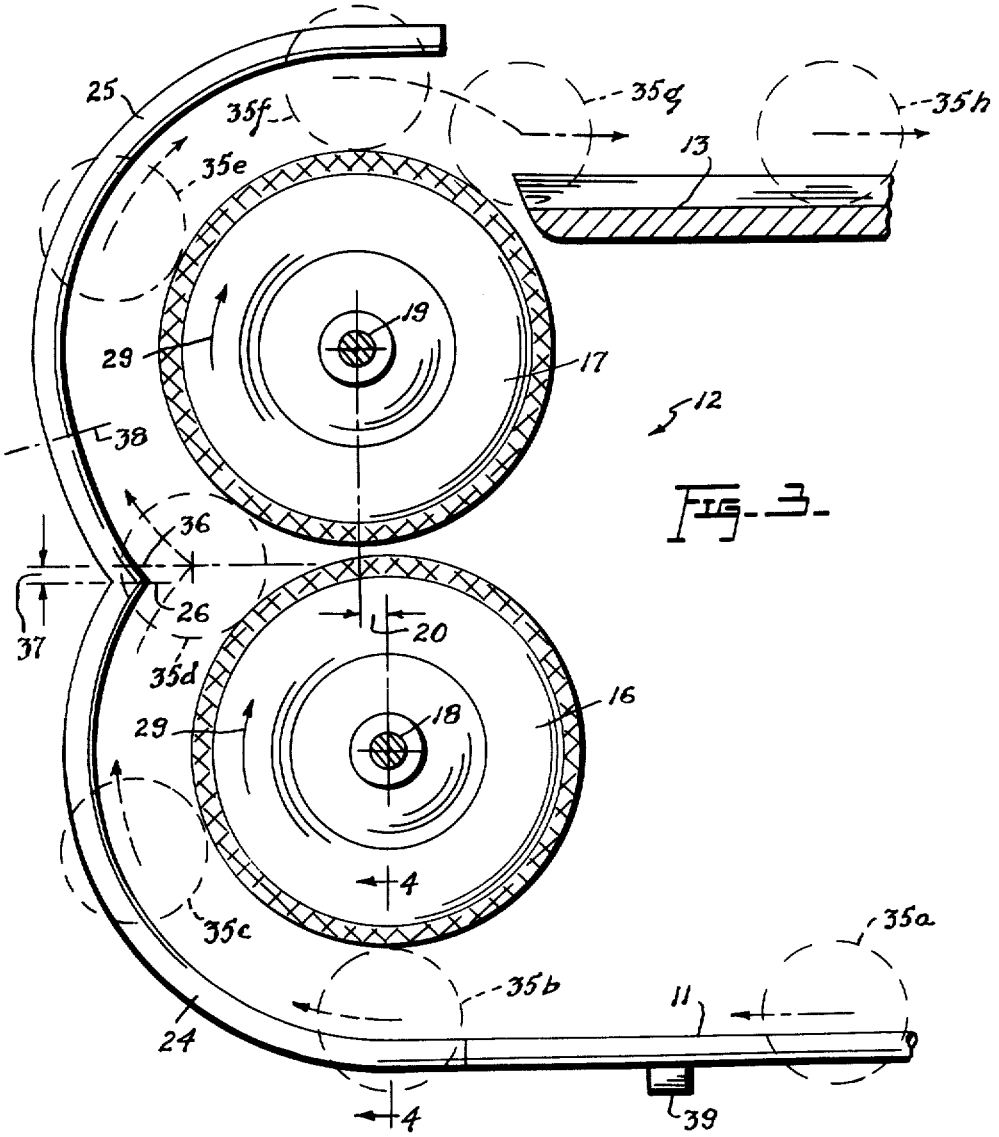
FIGURE 3 is a fragmentary vertical sectional view, taken substantially in the plane of the line 3—3 in FIGURE 2 but with the floor, mechanism supports, housing and brush means omitted for sake of clarity.

The mechanism comprises a lower elevator wheel 16 and an upper elevator wheel 17, secured to axles 18, 19 respectively, which are rotatably journalled in the frame members 15. The wheels 16, 17 are disposed in vertical alignment, but the axle 19 of the wheel 17 is horizontally offset from the axle 18 of the wheel 16 as indicated at 20 in FIGURE 3. In the vertical direction, the axles are spaced apart so that the peripheries of the wheels are closely adjacent, but do not contact each other.

Figure 4:
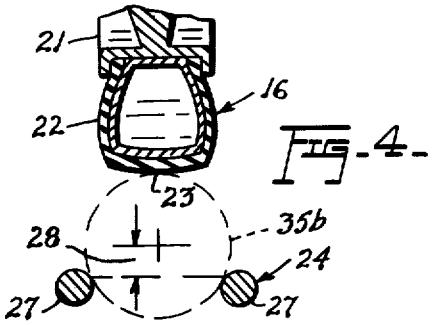
FIGURE 4 is a fragmentary sectional detail, taken substantially in the plane of the line 4—4 in FIGURE 3.

As illustrated in FIGURE 4, each of the wheels 16, 17 consists of a wheel proper 21 equipped with a pneumatic tire 22 having a studded tread 23 with good frictional gripping characteristics for engaging and propelling balls along guideways of the elevator, as will be presently explained.

A lower ball guideway 24 *comprising spaced rails* is provided adjacent the lower wheel 16, extending upwardly from the bottom of the lower wheel toward the upper wheel 17, the lower end of the guideway 24 communicating with the ball return runway 11. An upper ball guideway 25 communicates with the lower guideway 24 and extends upwardly to the top of the upper wheel 17, it being noted that the two guideways *in the illustrated embodiment* are joined together in a plane indicated at 26 in FIGURE 3, which plane is spaced downwardly from the top of the lower wheel 16. The guideways are curved in substantial concentricity with the peripheries of the respective wheels around which they partly extend and the guideways are spaced radially away from the wheel peripheries by the distance that balls engaging the guide ways are *grippingly* frictionally engaged by the peripheries of the wheels and in fact cause the pneumatic tires of the wheels to be compressed at their point of contact with the balls, by as much as ⅛ or 3/16 of an inch, to assure positive rolling action of the balls along the guideways when the wheels are rotated *and foreful ejection from the lower wheel and its guide track into gripping frictional engagement with the upper wheel and its guide track.*

Figure 5:
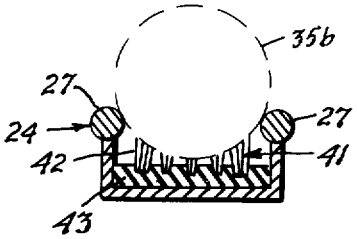
FIGURE 5 is an enlarged sectional detail, taken substantially in the plane of the line 5—5 in FIGURE 1.

It may be noted in this connection that the guideways 24, 25 like the runway 11, are preferably constructed from pairs or parallel, transversely spaced rods 27 as indicated in FIGURES 4 and 5. These rods are spaced apart by a distance which is such as to place the points of rolling contact of the ball with the guideways as close as is practically possible to the center of the ball, as shown at 28 in FIGURE 4, whereby the ball is caused to roll along the guideways at a faster rate than it would if the distance 28 were increased. This rapid rolling of the ball is desirable for purposes of cleaning and polishing the balls by brush means hereinafter described *and to assure together with the resiliency of the lower tire an ejection*

*force sufficient to forcefully project the ball into gripped engagement between the upper wheel and its track.*

The ball elevating wheels 16, 17 are rotated in the same direction indicated by the arrows 29 through the medium of an endless belt 30 passing around pulleys 31, 32, secured to the respective shafts 18, 19, and also passing around a relatively small pulley 33 on the armature of an electric motor 34 which may be conveniently mounted in the housing 14.

It will be apparent from the foregoing that balls rolling along the under-floor return runway 11 as indicated at 35a will *have sufficient momentum to forcefully* enter the lower end of the lower guideway 24 [and will] *to* be *grippingly* frictionally engaged by the lower wheel 16 as indicated at 35b, whereupon each ball will be propelled by the lower wheel along the lower guideway as at 35c until it [comes in contact with] *is forcefully projected into the space between* the lower portion of the *upper guide track and* upper wheel 17 [, while still remaining in contact with the lower wheel]. [This] *The* position of the ball *at the moment of ejection* is indicated at 35d (*FIGURE 3*) and it will be observed that at this point the center of the ball lies in a plane 36 which, like the aforementioned plane 26, is also below the top of the lower wheel 16, but is spaced upwardly from the plane 26 by a distance indicated at 37. In other words, at this point the center of the ball is above the junction point or plane 26 of the guideways 24, 25, so that in effect the ball is [already] *posed to be ejected from the end of guide track 24 into position to be placed* under guidance of the guideway 25 *and upper wheel 17* rather than of the lower guideway 24. The lower end portion of the upper guideway, for example, downwardly from the radial line 38 to the junction point 26 has a larger radius of curvature than the guideway portion above the line 38, so that the portion below the line 38 is farther away from the periphery of the wheel 17 than the guideway portion above that line, and by the same token, is also farther away from the *periphery of the tire on* wheel 17 than the guideway 24 is from the wheel 16. As a result, when the ball [enters] *leaves* the position 35d, it is transferred from the guideway 24 to the guideway 25 with what may be called a snap action, which is prompted by the aforementioned compressed state of the pneumatic tire of the wheel 16, acting to expel the ball [from the confines of the guideway 24] into the relatively less restricted confines of the portion of the guideway 25 below the line 38. Nevertheless, the portion of the guideway 25 below the line 38 is sufficiently close to the wheel 17 that the latter propels the ball upwardly along the guideway 25 as indicated at 35e and 35f, until the ball is discharged from the upper end of the guideway 25 as at 35g and rolls on to hte storage rack 13 as indicated at 35h. It is to be noted, however, that the snap *action* [section] which accompanies the transfer of the ball from the guideway 24 to the guideway 25 is such that it positively prevents any possibility of the ball becoming stuck at the position 35d, or travelling back downwardly along the lower guideway 24 if for some reason the direction of rotation of the wheels 16, 17 were reversed. To facilitate operation of the elevator as described, the guideways 24, 25 are disposed on the same side of the lower wheel 16 as the offset 20 of the upper axle 19 from the lower axle 18. The return runway 11 and the storage rack 13 are disposed at the relatively opposite side of the wheel axles 18, 19, with the storage rack overlying, above the floor 10, the runway 11 below the floor, as will be readily apparent.

Figure 2:
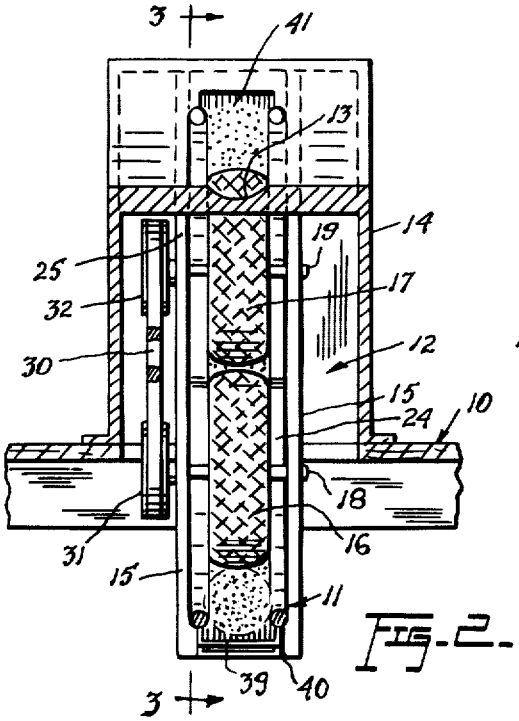
FIGURE 2 is a cross-sectional view, taken substantially in the plane of the line 2—2 in FIGURE 1.

The rods 27 of the runway 11 are held in transversely spaced relation by suitable cross bars 39, which may be downwardly arched or U-shaped to provide clearance for the balls on the runway. Similarly, the rods of the guideways 24, 25 have secured thereto curved channels 40 (*FIGURES 2 and 4*) of a U-shaped cross-section, which channels serve as holders for a brush assembly 41, best shown in FIGURE 5. The brush assembly consists of tufts of bristles 42 mounted in a suitable base 43 accommodated in the channels 40 so that the bristles 42 are disposed between the rods 27 of the guideways 24, 25 and frictionally engage the balls travelling along the guideways. In this manner, the balls are automatically cleaned and polished during their passage through the elevator, so that they are in proper condition for use by the time they reach the storage rack 13. As already noted, the rapid rotation of the balls during their passage through the elevator is essential to permit an efficient cleaning and polishing action to be effected.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, lying within the spirit and scope of the invention as claimed.

What is claimed as new is:

1. In a bowling ball elevator and return mechanism, the combination of vertically coplanar lower and upper elevator wheels having resiliently compressible peripheral portions, a curved lower ball guideway extending from the bottom of the lower wheel upwardly around a side portion of its periphery toward the upper wheel, a curved upper ball guideway communicating with said lower guideway and extending upwardly around a portion of the periphery of the upper wheel on the same side as the guideway of the lower wheel, the axis of rotation of said upper wheel being horizontally offset from the axis of rotation of the lower wheel to the same side of the wheels at which the guideways thereof are disposed, means for delivering balls to the lower end of the lower guideway, means for receiving balls from the upper end of the upper guideway, and means for rotating said wheels, said lower guideway being substantially concentric with and spaced radially from the lower wheel by a distance to compress the resiliently compressible peripheral portion of the lower wheel by a ball propelled upwardly along the lower guideway by the lower wheel, said lower and upper guideways having a junction in a plane spaced downwardly from the top of the lower wheel, the lower portion of said upper guideway being spaced radially from the upper wheel by a distance greater than the spacing of the lower guideway from the lower wheel whereby a ball in the lower guideway compressing the peripheral portion of the lower wheel may be resiliently ejected from the lower guideway with a snap action into said lower portion of the upper guideway *with sufficient velocity to insure that the ball is gripped and advanced by said upper wheel,* and the spacing of the upper guideway including that of said lower portion thereof from the upper wheel being such that a ball received in said lower portion of the upper guideway may be propelled upwardly along the upper guideway by the upper wheel to said ball receiving means.

2. In a bowling ball elevator and return mechanism, the combination of a lower elevator wheel, an upper elevator wheel vertically coplanar with the lower wheel and having its axis of rotation spaced horizontally to one side of the axis of rotation of the lower wheel, said wheels having resiliently compressible peripheral portions, a curved lower ball guideway extending from the bottom of the lower wheel upwardly around a portion of its periphery toward the upper wheel, a curved upper ball guideway communicating with said lower guideway and extending upwardly around a portion of the periphery of the upper wheel to the top of the upper wheel, said lower and upper guideways being disposed on that side of the wheels to which the axis of the upper wheel is offset from the axis of the lower wheel, a return ball runway communicating with the lower end of said lower guideway, a ball storage rack having the upper end of the upper guideway discharging thereinto, and means for rotating said wheels, said lower guideway being substantially concentric with and spaced radially from the lower wheel by a distance to compress the resiliently compressible peripheral portion of the lower wheel by a ball propelled upwardly along the lower guideway by the lower wheel, said lower and upper guideways having a junction in a plane spaced downwardly from the top of the lower wheel, the lower portion of said upper guideway being spaced radially from the upper wheel by a distance greater than the spacing of the lower guideway from the lower wheel whereby a ball in the lower guideway compressing the peripheral portion of the lower wheel may be resiliently ejected from the lower guideway with a snap action into said lower portion of the upper guideway *with sufficient velocity to insure that the ball is gripped and advanced by said upper wheel,* and the spacing of the upper guideway including that of said lower portion thereof from the upper wheel being such that a ball received in said lower portion of the upper guideway may be propelled upwardly along the upper guideway by the upper wheel and discharged into said storage rack.

3. In a ball lift, the combination of a lower elevator wheel and an upper elevator wheel arranged generally one above the other to raise a bowling ball in a generally upright planar path, the upper wheel having its axis of rotation spaced horizontally to one side of the axis of rotation of the lower wheel, a curved lower ball guideway extending from the bottom of the lower wheel upwardly around a portion of its periphery toward the upper wheel, a curved upper ball guideway communicating with said lower guideway and extending upwardly around a portion of the periphery of the upper wheel, said guideways being positioned to hold a ball in engagement with said wheels and being disposed on that side of the wheels to which the axis of the upper wheel is offset from the axis of the lower wheel, and means for rotating said wheels, said lower wheel being resiliently compressible, said lower guideway being spaced from the lower wheel by a distance to resiliently compress the lower wheel by a ball propelled upwardly along the lower guideway by the lower wheel, and the lower portion of said upper guideway being spaced from the upper wheel by a distance greater than the spacing of the lower guideway from the lower wheel whereby a ball in the lower guideway compressing the lower wheel may be resiliently ejected from the lower guideway with a snap action into said lower portion of the upper guideway [for upward propulsion in the latter by the] *with sufficient velocity to insure that the ball is gripped and advanced by said upper wheel.*

4. A ball lift comprising, a first ball conveying mechanism for receiving a ball from an alley return track comprising a first rotatable member and a first guide track spaced from said member, said guide track having a part generally concentric with the member axis of rotation and positioned to hold a ball in engagement with the first member, a second ball conveying mechanism for receiving a ball from the first conveying mechanism and discharging the ball to a storage mechanism comprising a second rotatable member and a second guide track spaced from said second member, said second guide track having a part generally concentric with the second member axis of rotation and positioned to hold the ball in engagement with the second member, the rotational axis of said first member being vertically offset from the rotational axis of said second member and said first guide track intersecting said second guide track at a level spaced below the top of said first member, means for rotating said members, a return ball runway communicating with the lower end of said first guide track to deliver a ball to the latter, and a ball storage rack communicating with the upper end of the second guide track for receiving balls from the latter, said first member being resiliently compressible, said first guide track being spaced from said first member by a distance to resiliently compress the first member by a ball conveyed along the first guide track by the first member, and said second guide track having a lower part spaced from said second member by a distance greater than the spacing of said first guide track from said first member whereby a ball in the first guide track compressing said first member may be resiliently ejected from the first guide track with a snap action into said lower part of the second guide track *with sufficient velocity to insure that the ball is gripped and advanced by said second rotatable member.*

5. A ball handling apparatus, comprising a ball storage rack in an approach adjacent to a bowling alley, a ball return track for returning a ball from the pit end of the alley toward the approach area, means adjacent said rack for transferring a ball from said return track to said rack including a first rotatable wheel overlying said return track to engage a ball thereon, a first guide track having a part curved about the periphery of said first wheel to maintain a ball in engagement with said wheel, a second rotatable wheel having its axis spaced from the axis of the first wheel, a second guide track for receiving a ball from the first wheel and guide track including an intermediate part curved about the periphery of the second wheel and a discharge end adjacent said rack, and means for rotating said wheels, said first wheel being resiliently compressible, said first guide track being spaced from said first wheel by a distance to resiliently compress the first wheel by a ball between the first track and the first wheel, said second guide track also including a lower part spaced from said second wheel by a distance greater than the spacing of the first track from the first wheel whereby a ball in the first guide track compressing the first wheel may be resiliently ejected from the first track with a snap action into said lower part of the second guide track *with sufficient velocity to insure that the ball is gripped and advanced by said second wheel.*

6. In a bowling ball elevator, the combination of a resiliently compressible lower elevator wheel, a curved lower ball guideway extending partly around said lower wheel to maintain a ball in engagement with the latter for propulsion of the ball upwardly along the lower guideway, said lower guideway including an upper portion spaced from said lower wheel by a distance to resiliently compress the lower wheel by a ball in said upper portion of the lower guideway, an upper elevator wheel, a curved upper ball guideway extending partly around said upper wheel to maintain a ball in engagement with the latter for propulsion of the ball upwardly along the upper guideway, said upper guideway including a lower portion adapted to receive a ball from said upper portion of said lower guideway, and means for rotating said wheels, said lower portion of the upper guideway being spaced from said upper wheel by a distance greater than the spacing of said upper portion of the lower guideway from the lower wheel whereby a ball in the upper portion of the lower guideway compressing the lower wheel may be resiliently ejected therefrom with a snap action into said lower portion of the upper guideway *with sufficient velocity to insure that said ball is gripped and advanced by said upper wheel.*

*7. In a bowling ball elevator, the combination of a resiliently compressible lower elevator wheel, a curved lower ball guideway extending partly around said lower wheel to maintain a ball in compressible engagement with the latter for propulsion of the ball upwardly along the lower guideway, an upper elevator wheel, a curved upper ball guideway extending partly around said upper wheel to maintain a ball in engagement with the latter for propulsion of the ball upwardly along the upper guideway, said upper guideway including a lower portion adapted to receive a ball from the upper portion of said lower guideway, means for rotating said wheels, and means at the adjacently related ends of said guideways for forcing the ball to compress the lower wheel sufficiently to effect resilient ejection of the ball from said*

*lower guideway with a snap action into said lower portion of the upper guideway with sufficient velocity to insure gripping and advancement of said ball by said upper wheel, the passage space for said ball immediately beyond the region of ejection being greater than the ball passage space at said region of ejection.*

*8. A bowling ball handling apparatus, comprising a ball storage rack adjacent the approach area to a bowling alley, a ball return track for returning a ball from the pit end of the alley to said approach area, means adjacent said storage rack for transferring a ball from the approach area end of said ball return track to said storage rack including a first compressible tired rotatable wheel disposed adjacent to the approach area end of said ball return track, a first guide track curved about the periphery of said first compressible tired wheel and spaced therefrom to provide a passage for receiving a ball passing from said ball return track end and maintaining said ball in compressed engagement with said first compressible tired wheel during its passage along said first guide track, a second compressible tired rotatable wheel having its axis and tire periphery respectively vertically spaced from the axis and tire periphery of said first compressible tired wheel, a second guide track curved about the periphery of said second compressible tired wheel and spaced therefrom to provide a passage for receiving a ball passing from said first guide track and maintaining said ball in compressed engagement with said second compressible tired wheel during its passage along said second guide track to said storage rack, hood means enclosing said compressible tired wheels and their respective guide tracks,*

*means for driving said first compressible tired wheel in a direction and at a speed to drivingly engage a ball passing from the ball return track to said first guide track and for driving the second compressible tired wheel in a direction and at a speed to drivingly engage a ball passing from said first track to said second guide track and discharge the ball onto said storage rack, and means at the adjacently related ends of said first and second guide tracks to effect a forceful ejection of the ball into the passage between the upper wheel and said adjacently related end of said second guide track with sufficient velocity to insure that the ball is gripped and advanced by said upper wheel, the passage space for said ball immediately beyond the region of ejection being greater than the ball passage space at said region of ejection.*

References Cited by the Examiner

The following references, cited by the Examiner, are of record in the patented file of this patent or the original patent.

UNITED STATES PATENTS

| | | | |
|---|---|---|---|
| 1,468,212 | 9/1923 | Redfield | 273—43 |
| 2,217,256 | 10/1940 | McCauley | 273—47 |
| 2,796,261 | 6/1957 | Turner | 273—49 |
| 2,796,970 | 6/1957 | Borrowdale | 198—212 |
| 3,109,649 | 11/1963 | Anderson et al. | 273—49 |

FOREIGN PATENTS

| | | |
|---|---|---|
| 867,937 | 5/1961 | Great Britain. |

DELBERT B. LOWE, *Primary Examiner.*